(12) United States Patent
Ludois et al.

(10) Patent No.: US 11,012,003 B2
(45) Date of Patent: May 18, 2021

(54) SENSORLESS CONTROLLER FOR ELECTROSTATIC MACHINE

(71) Applicant: Wisconsin Alumni Research Foundation, Madison, WI (US)

(72) Inventors: Daniel Colin Ludois, Middleton, WI (US); Aditya N. Ghule, Madison, WI (US); Peter Killeen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 84 days.

(21) Appl. No.: 16/566,250

(22) Filed: Sep. 10, 2019

(65) Prior Publication Data

US 2021/0075343 A1    Mar. 11, 2021

(51) Int. Cl.
*H02N 1/00*    (2006.01)
*H02N 1/08*    (2006.01)

(52) U.S. Cl.
CPC ............. *H02N 1/004* (2013.01); *H02N 1/002* (2013.01); *H02N 1/00* (2013.01)

(58) Field of Classification Search
CPC ........... H02P 21/50; H02P 6/085; H02N 1/00; H02N 1/002; H02N 1/004; H02N 1/008
USPC .......................... 310/300, 308–309; 318/116
See application file for complete search history.

(56) References Cited

U.S. PATENT DOCUMENTS

| | | | |
|---|---|---|---|
| 9,184,676 B2 * | 11/2015 | Ludois | H02N 1/006 |
| 9,356,546 B2 * | 5/2016 | Yang | B60L 15/025 |
| 9,899,937 B2 * | 2/2018 | Ge | H02N 1/006 |
| 9,960,719 B1 | 5/2018 | Ghule et al. | |
| 9,979,323 B1 | 5/2018 | Ghuke et al. | |
| 9,998,052 B2 | 6/2018 | Shimada et al. | |
| 2007/0057595 A1 | 3/2007 | Corredoura | |
| 2019/0296659 A1 * | 9/2019 | Reitz | H02N 1/08 |

FOREIGN PATENT DOCUMENTS

| | | |
|---|---|---|
| JP | 2015012791 A | 1/2015 |
| KR | 101996979 B1 | 7/2019 |

* cited by examiner

*Primary Examiner* — Burton S Mullins
(74) *Attorney, Agent, or Firm* — Boyle Fredrickson, S.C.

(57) ABSTRACT

A variable speed drive for an electrostatic motor provides feedback control according to rotor position and/or rotor rotational rate deduced from back currents (back-MMF). Extraction of the back currents is performed by a modeling of the stator and the development of isolated stator voltages from plate voltage measurements.

17 Claims, 6 Drawing Sheets

SENSORLESS CONTROLLER FOR ELECTROSTATIC MACHINE

STATEMENT REGARDING FEDERALLY SPONSORED RESEARCH FOR DEVELOPMENT

CROSS-REFERENCE TO RELATED APPLICATIONS

BACKGROUND OF THE INVENTION

The present invention relates to electrostatic machines (motors and generators) and, in particular, to a motor drive system sensing rotor position and/or velocity without the need for a separate resolver, or the like, mechanically attached to the rotor.

Electrostatic machines provide an alternative to electromagnetic machines which exploit electrically induced electrical fields and change in capacitance to provide a motivating force. Electrostatic machines have a number of advantages over conventional electromagnetic rotating electrical machines including the elimination of magnets and costly rare earth materials, reduction of the significant weight of ferrous materials, and reduced reliance on costly high-current copper windings.

Another significant advantage of electrostatic machines is their ability to hold a torque or position without substantial current flow or resistive heating losses of a type that occur in the electromagnetic coils of conventional electromagnetic machines. This feature makes electrostatic machines attractive for high-torque, low-speed operation and positioning.

Electrostatic machines used for low-speed or positioning applications can employ a large number of electrical poles. For example, in contrast to electromagnetic motors which typically have a limited number of poles (e.g., 8), an electrostatic motor may include as many as 96 poles or more. Precise position control within an electrical cycle of an electrostatic motor having 96 poles requires mechanical resolution of the resolver that is an order of magnitude higher than that required for electromagnetic motors and exceeds the capabilities of a standard 12-bit encoder. As a result, expensive 15-bit encoders or higher may be required for electrostatic machines in such applications.

SUMMARY OF THE INVENTION

It is recognized that electrostatic motors provide a "back-current" or back-MMF (magnetomotive force) roughly analogous to the back EMF (electromotive force) of a standard electromagnetic motor. The measure of MMF, also called the back current, will generally be a vector having phase and magnitude, either or both of which may provide information to deduce position and or speed. The present invention provides a method of extracting measurements of the MMF from an electrostatic motor when the electrostatic motor is advantageously powered by a current drive, for example, of a type described in U.S. Pat. No. 9,979,323 naming co-inventor, Ludois, and hereby incorporated by reference. Importantly, the invention permits tractable voltage sampling at the motor terminals without the need for bulky current transformers or the like. At modest speeds, this MMF value may be used to deduce position and/or motor speed without the need for a resolver at the necessary resolution. At low or zero speeds, when there is insufficient/insignificant MMF, position and/or velocity may be sensed by injecting a current in either the rotor or stator to serve in place of the MMF measurement. On the other hand, at high speeds injecting a current distinguishable from the driving current can be difficult making MMF sensing preferable.

Specifically, then, in one embodiment, the invention provides an electrostatic motor drive for an electrostatic motor which includes a set of current-source drives adapted to connect to the multiple stator electrodes. A back-current monitor circuit detects a back-current value from the electrostatic motor proportional to rotor speed, and a back-current conditioning circuit receives the detected back-current value to provide at least one of an estimated rotor position and rotor speed which is provided to a comparison circuit which receives the at least one of estimated rotor position and rotor speed, and a motor control value and compares the two to produce an error output to the set of current-source drives. The back-current monitoring circuit may take voltage measurements at the connections between the current-source drives and corresponding stator electrodes.

It is thus a feature of at least one embodiment of the invention to provide position and/or velocity measurements of the motor shaft of the type for high-pole-number electrostatic motors for low-speed and high-torque applications using simple voltage monitoring eliminating the need for direct output back-current sensing.

The current-source drives may provide a set of electrical switches in series with a current source implemented by an inductance serving to modulate current to the stator electrodes and regulate voltage.

It is thus a feature of at least one embodiment of the invention to provide a resolver-less position/rotational rate sensor compatible with current-source drives of a type advantageous for electrostatic motors.

The back-current monitoring circuit may compare the voltage measurements to a common voltage to extract stator voltages isolated from common mode voltage.

It is thus a feature of at least one embodiment of the invention to eliminate the effects of highly variable common mode voltages on the calculation of back-current.

The monitoring circuit may model an impedance of the stator circuit to deduce current through each stator electrode and may compare that deduced current to the drive current from the current-source drive associated with the stator electrode to deduce back current.

It is thus a feature of at least one embodiment of the invention to deduce forward current into the stator, as necessary to compute the back current from a voltage measurement.

The back-current conditioning circuit may further measure a peak of the back current to provide a velocity signal, and the comparison circuit may further use the velocity signal to provide the error output.

It is thus a feature of at least one embodiment of the invention to provide an independent measurement of velocity useful for, for example, velocity control of the motor.

The back-current conditioning circuit may extract the estimated rotor position dependent on variations in the back current.

It is thus a feature of at least one embodiment of the invention to deduce position from position dependent changes in the back current.

The electrostatic motor drive may further include a signal generator providing an injection signal to one of the rotor and stator;

an extraction circuit monitoring at least one of the rotor and stator to extract a resulting signal indicating at least one of capacitive coupling between the rotor and stator and changing effective capacitance of at least one of the rotor and stator from saliency and spatial alignment; and a conditioning circuit receiving the resulting signal to provide an estimated rotor position;

wherein the comparison circuit also receives the estimated rotor position signal from the saliency and spatial alignment conditioning circuit to develop the error output.

It is thus a feature of at least one embodiment of the invention to accommodate the low signal-to-noise ratio of the back-current signal at low speeds for low-speed control.

The electrostatic motor drive may further include a switch for selectively communicating one of the estimated rotor position signals from the saliency conditioning circuit and the estimated rotor positioning signal from the back-current conditioning circuit for use by the comparison circuit.

It is thus a feature of at least one embodiment of the invention to provide an automatic basis for switching between back current and injection-current position sensing.

The switch may be controlled by an estimated rotor speed derived from at least one of the back-current conditioning circuit and the saliency conditioning circuit.

It is thus a feature of at least one embodiment of the invention to make use of the rotor speed derived from the sensing systems of the present invention to select between those sensing systems.

These particular features and advantages may apply to only some embodiments falling within the claims and thus do not define the scope of the invention.

DETAILED DESCRIPTION OF THE PREFERRED EMBODIMENT

Electrostatic Motor Design

Figure 1:
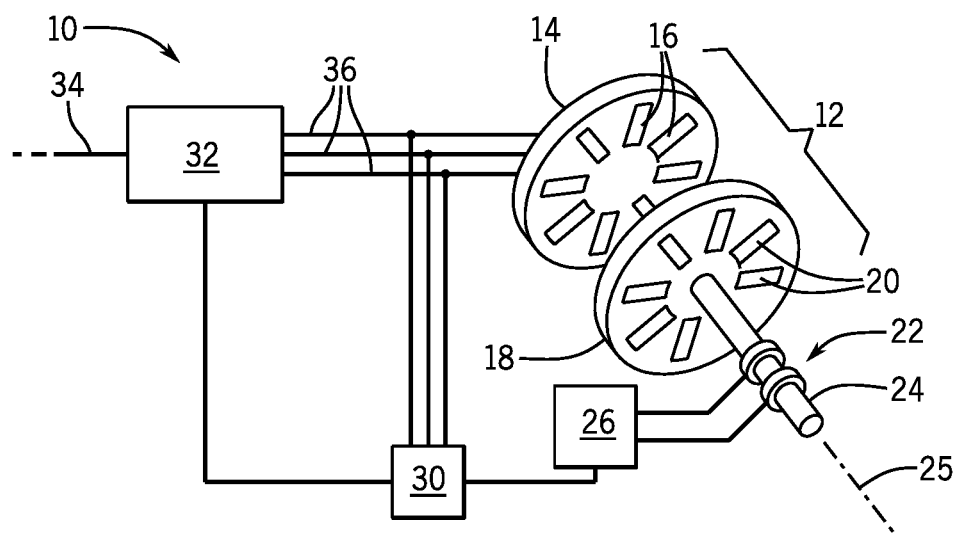
FIG. 1 is a simplified exploded diagram of the drive system of the present invention attached to an example axial flux electrostatic motor.

Referring now to FIG. 1, an electrostatic drive system 10 may include an electrostatic motor 12 in one example having one or more disk-shaped plates having radially-extending, circumferentially displaced stator electrodes 16. The stator electrodes 16 interact with corresponding radially-extending, circumferentially displaced rotor electrodes 20 on a corresponding disk-shaped rotor 18 positioned adjacent to the disk-shaped stator 14. For simplicity, the stator electrodes 16 and rotor electrodes 20 are shown on the visible surface of the stator 14 and rotor 18; however, they will normally be closely proximate on opposed faces of the stator 14 and rotor 18. This type of motor will be termed an "axial field" motor referring generally to the alignment of the electrostatic field along an axis 25 of rotation of the rotor 18.

The present invention also contemplates operation with a "radial field" motor having an electric field extending perpendicularly to the axis 25, for example, with circumferentially nested cylindrical plates or rings of axially extending pegs. Normally the number of rotor electrodes 20 in each of these types of motors will match the number of poles of the motor. This number of poles normally will be in excess of 16 and more typically in excess of 60 and preferably 96 or more.

Axial field and radial field motors are described in U.S. Pat. No. 9,184,676; 2016/0211775; and 2016/0344306 all assigned to the assignee of the present invention and incorporated by reference. The present invention is applicable to both types of motors.

In both of the designs of radial and axial flux motors, the rotors 18 may be supported for rotation on driveshafts 24 extending along axis 25 for the extraction of mechanical work. A slip ring or brushless power transfer system 22 (e.g., capacitive or inductive) is attached to the driveshaft 24 which allows electricity from a stationary rotor power supply 26 to be conducted to the rotating rotor electrodes 20, as is generally understood in the art, to provide an electrostatic polarization of the rotor 18.

Overview of Variable Speed Drive

A variable speed drive 32 may provide for controlled application of power to the stator electrodes 16 of the stator 14 based on the position signal generated by a position detection system 30. In this regard, the variable speed drive 32 may receive a command signal 34, for example, a position, speed, torque, or other related quantity, and determine the proper variable currents to be applied to the stator electrodes 16 to provide operation of the electrostatic motor 12 in conformance with that command signal 34. As such, the output of the variable speed drive 32 will provide multiple phases 36 (also designated A, B, C, for a three phase embodiment) associated with different stator electrodes 16 providing sinusoidal or other continuously varying signals to those stator electrodes 16 necessary to control motor operation.

Figure 2:
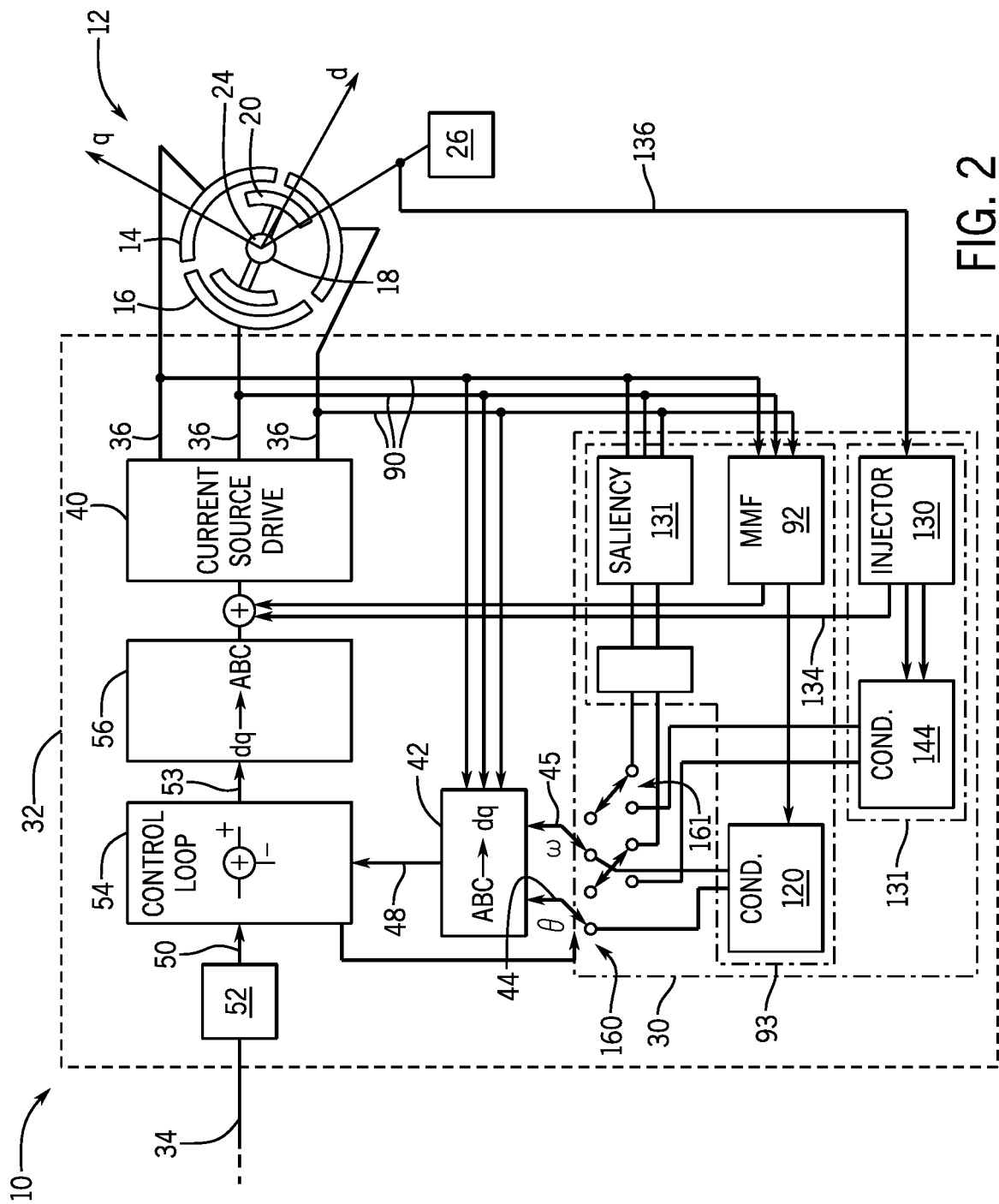
FIG. 2 is a detailed block diagram of the motor drive of FIG. 1 showing a current-source drive and a back-current detection system and an injection current detection system replacing a resolver for controlling a current-source drive.

Referring now to FIG. 2, the instantaneous values of the output phases 36 required for a given command signal 34 can be a function of not only the command signal 34 but also rotor position and the characteristics of the motor 12. This processing necessary to generate the output phases 36 may be simplified through a coordinate transformation known in conventional electromagnetic motors in which constantly varying multiple phases 36 are mapped to a reference frame rotating with the motor rotor 18. This reference frame is termed the d-q reference frame where the d axis (the direct axis) is aligned with the positive electrode on the electrodes 20 and the q axis (the quadrature axis) is positioned at 90 degrees with respect to the d axis. Viewed in this reference frame, the complexity of the waveforms at the multiple phases 36 (termed A, B, C, for an example, in a three-phase system) devolves to a single vector that is largely unvarying for steady-state operation of the motor 12. Details of this transformation in the context of electromagnetic machines are described, for example, at D. W. Novotny and T. A. Lipo, "Vector Control and Dynamics of AC Drives," 1st edition, Oxford University Press, 1996 (including pages 88-102) with the underlying mathematics also applicable to the present invention.

Using this transformation, the present invention provides a feedback control of a current-source drive 40 having phases 36 connected to each of the stator electrodes 16. In this regard, voltages from each of these phases 36 are measured and these measurements received by ABC-dq transformation circuit 42. The ABC-dq transformation circuit 42 also receives a position signal 44 and a velocity signal 45 from the position detection system 30 to convert the received phase signals (A, B, C) into a vector in d-q space termed the "measured" d-q vector 48.

The input command signal 34 will be converted to a similar "desired" d-q vector 50 by input conversion circuit 52. This desired d-q vector 50 will generally have a different angle and different magnitude than the measured d-q vector 48 when the electrostatic motor 12 is not operating in steady-state. When the input command signal 34 is a torque value, the magnitude of the desired d-q vector 50 will be proportional to the desired torque, and the ideal angle with respect to the q-axis will depend on the type of motor 12. For a non-salient machine, the angle will simply be zero degrees (a desired d-q vector 50 aligned with the q-axis); however, for a salient machine this calculation will be more complex as discussed U.S. Pat. No. 9,979,323 assigned to the assignee of the present invention and hereby incorporated by reference. The ideal angle is one that provides maximum torque per voltage thereby reducing motor losses. Alternatively, the command signal 34 may be a velocity value in which case the velocity signal 45 is used. More generally an arbitrary control strategy may use both the position signal 44 and velocity signal 45.

Once the desired d-q vector 50 is determined, it is compared it to the measured d-q vector 48 to produce an error value 53 at comparison circuit 54 which controls the current source 40. In the simplest case, error value 53 is simply a difference between the desired d-q vector 50 and the measured d-q vector 48; however, alternatively, this difference may be further processed, for example, under proportional/integral/derivative type control strategies in which the error value 53 is a weighted combination of the difference value, a time running integration of this difference value, and a derivative of this difference value. It will also be appreciated that other control strategies may be used by comparison circuit 54 including feedback and/or feedforward of other measured variables derived from the motor 12.

Referring still to FIG. 2, the error value 53 is then provided to a dq-ABC transformation circuit 56 operating in the reverse direction as the ABC-dq transformation circuit 42 (as inverse transforms) to change the error value 53, being a vector in d-q space, to phases 36 in a nonrotating frame.

This feedback control process, traversing the loop of ABC-dq transformation circuit 42 and dq-ABC transformation circuit 56, continues during operation of the motor 12.

When the command signal 34 is a different value, for example, a desired rotational speed (e.g., RPM), an additional, optional feedback loop may be incorporated, for example, using the position signal 44 to deduce speed and using a difference between the desired RPM of the command signal 34 and the deduced RPM, at optional comparison block 58, to create a torque value that may then be treated as discussed above with respect to the torque signal. Other input signals can also be handled in this manner, and in this regard the invention contemplates that programmable command signals 34 may be used, for example, for soft start and stop of the motor 12 as well as different regimes at different motor RPMs or operating conditions.

The ABC-dq transformation circuit 42, input conversion circuit 52, comparison circuit 54, and dq-ABC transformation circuit 56 may be implemented by discrete circuitry or preferably by a high-speed computer processor executing a program stored in non-transient computer memory, for example, as firmware and employing analog-to-digital converters to operate in a digital domain.

Figure 3:
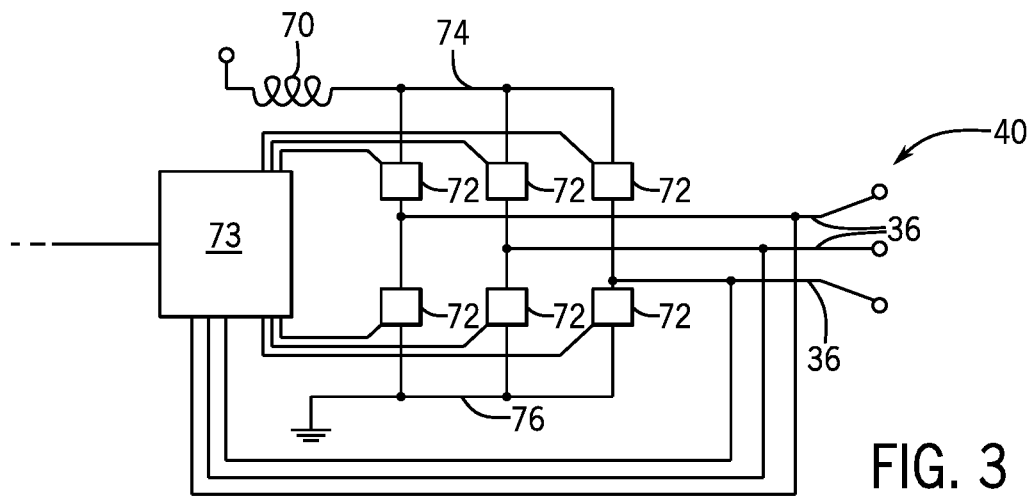
FIG. 3 is a more detailed block diagram of the current-source drive of FIG. 2 providing separate current sources for each of three stator plates of a three-phase electrostatic motor.

Referring now to FIG. 3, a practical implication of sophisticated field control of an electrostatic motor is enabled by the ability to generate "stiff" current output signals at the power levels needed to drive electrostatic motor 12, that is, outputs that can provide open-loop current control in the face of rapidly fluctuating voltages at the multiple phases 36 caused by changes in capacitive coupling with rotation of the motor 12. The invention contemplates that the electrostatic motors 12 will operate at powers in excess of 10 watts, typically in excess of 100 watts, and desirably in excess of 1000 watts.

The necessary "current-source" outputs may be produced through the use of one or more series inductive elements 78 exploiting a feature of inductance that resists changes in the current flowing through the inductor, a feature of the buildup of self-induced energy within the magnetic field of the inductor. The present invention recognizes that this property can be enlisted to provide sufficient output current stiffness to be able to regulate output voltages without preventing dynamic control of the necessary current for "charge oriented" control of the motor or variable speed capabilities. In this regard the inductance must be of a size to provide current regulation (and hence energy storage) at the expected motor power levels providing, for example, for the control of current output to the motor to within 25 percent of the command value controlling the semiconductor switches, and typically within 10 percent, and desirably within five percent. Construction of such a current-source drive is described in U.S. Pat. No. 9,960,719 assigned to the assignee of the present invention and hereby incorporated by reference.

In one implementation, a source of DC power is provided to set of solid-state switches 72, for example, transistors such as MOSFET transistors, receiving ABC current values from the switching logic circuit 73. The solid-state switches 72, for example, are configured in an H-bridge where each of the phases 36 connects to a junction between a pair of series-connected switches 72, the pair in turn spanning a positive power rail 74 and a negative power rail 76 providing a direct current stabilized by inductor 70. Rudimentary use of this circuit can produce square wave outputs; however, the present invention contemplates that the phases 36 produced are continuous waveforms of arbitrary shape and frequency dictated by the control algorithm. Accordingly, the switches 72 will receive control signals determining their switch state that are pulse-width modulated (or modulated by a similar modulation technique including pulse-density modulation etc.). In pulse width modulation, an on-time of the switch 72 is varied to determine the average current value output through the phase 36. In such modulation, the switches 72 are operated in switched mode (either on or off) for energy efficiency, but switch at high rates to produce continuous waveforms (e.g., sine waves of different frequencies) smoothed by the capacitance of the electrostatic motor 12. In pulse width modulation, the switching speed of the semiconductors is at many times the fundamental frequency of the waveform of phases 36 and typically more than 10-20 times that frequency.

An inductor 70 may be placed in series with the switches 72 of the H-bridge to stabilize the DC bus which feeds the switches 72. Other placements of the inductor (for example with one inductor on each of the phases 36) or the use of a transformer having leakage inductance may be provided to similar effect.

Position Sensing

Referring again to FIG. 2, the position signal 44 and velocity signal 45 may be obtained from a resolver; however, in the present invention, these signals may be provided by position detection system 30 receiving voltage signals 90 from each of the phases 36 of the current-source drive 40. The position detection system 30 may include two distinct components: a back-current or "back-MMF" (magnetomotive force) detector system 93, including MMF detector 92 and conditioning circuit 120, and an injection current system 131, including current injection circuit 130 and conditioning circuit 144. Both of these systems receive voltage measurements of the phases 36 provided to the electrode 16 of the stator 14 to produce position signals and velocity signals.

The back-MMF detector 93 detects a back MMF that is a function of rotor speed and which can also be used to provide a position signal based on variations in the MMF with rotation.

Figure 8:
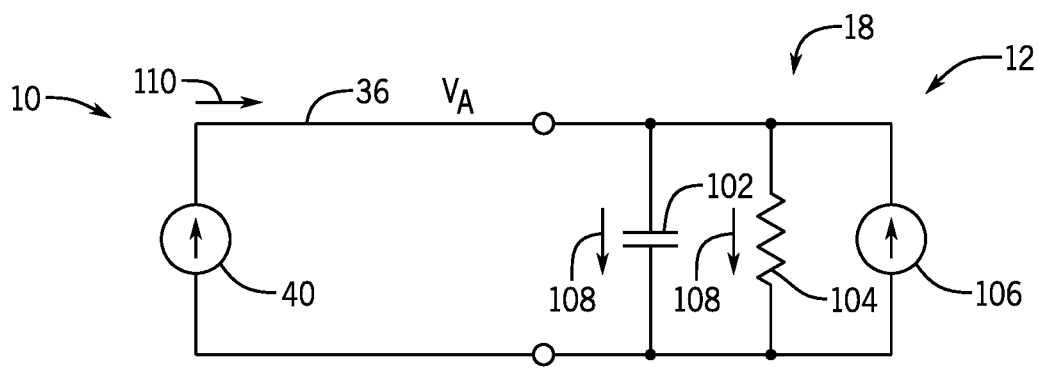
FIG. 8 is a diagrammatic representation a model of the stator for deducing back current from voltage measurements.
Figure 9:
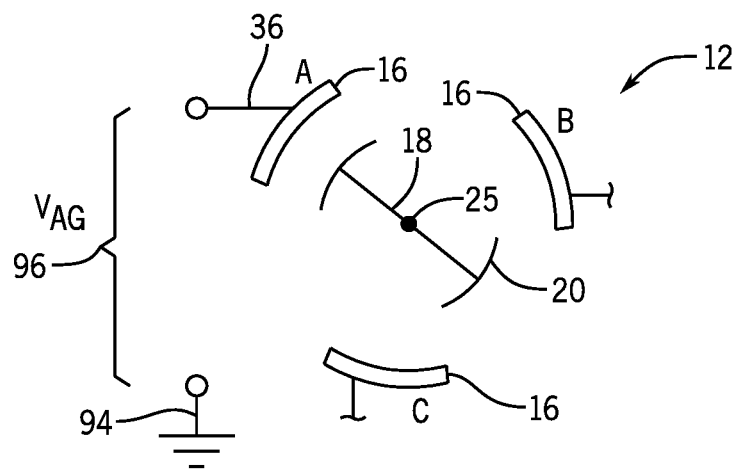
FIG. 9 is a simplified diagram of the stator electrodes showing a voltage measurement of one electrode.

Referring now to FIGS. 8 and 9, the MMF detector 92 may measure the voltage at each phase 36 with respect to a common voltage reference 94 (for example, ground) to provide a raw phase voltage 96 associated with each phase (e.g., $V_{AG}$ being the voltage between phase A and ground, $V_{BG}$ being the voltage between phase B and ground, and $V_{CG}$ being the voltage between phase C and ground in an example 3 phase motor). These raw phase voltages 96 will include a common mode voltage which is highly variable and can obscure the desired back-current measurement.

Figure 10:
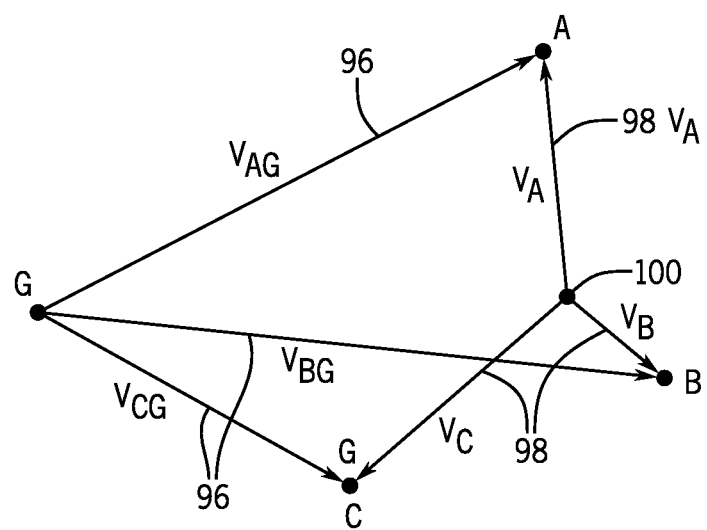
FIG. 10 is a phasor diagram boasting the extraction of isolated phase voltages.

Accordingly, and referring to FIG. 10, each raw phase voltage 96 may be combined to extract an isolated phase voltage for each electrode 16. This extraction process can be understood diagrammatically by envisioning the isolated phase voltages as being phasors 98 extending at equal angles from and rotating about a common voltage center 100 which varies as the common mode voltage. It will be appreciated that with the constraint that the phasors 98 must be at equal angles from each other, the length of each phasor 98 (the isolated phase voltage) may be uniquely calculated from knowledge of the length and relative angles of the phasors 96 using geometric analysis, thus eliminating the effect of the common mode voltage.

Referring now to FIG. 8, each of the stator electrodes 16 may be modeled by a fixed capacitance 102, a fixed resistance 104, and a current source 106 representing the back-MMF being a function of rotor speed. The capacitance 102 will typically vary as a function of rotor position but may be modeled as an average value determined empirically, and the positional variations attributed to the current-source 106. The capacitance 102 and fixed resistance 104 may be determined empirically or may be deduced during operation of the electrostatic drive system 10.

The model may be used to determine the back-MMF of the current-source 106 by applying the isolated phase voltage (e.g., $V_A$) to this model to determine a received current 108 (the combined current through capacitor 102 and resistor 104) that would occur if the measured voltage (e.g., $V_A$) were applied across the model. This received current 108 may then be compared to the commanded current 110 from the current-source drive 40. The difference between currents 110 and 108 will be the effective current from current source 106 being the back-MMF.

Figure 6:
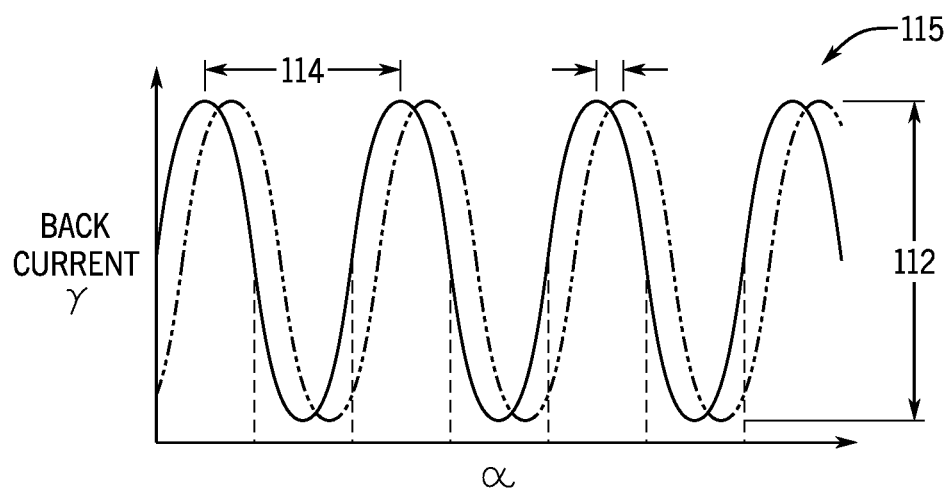
FIG. 6 is a plot of back current for the d and q transformation axes.

Referring now to FIG. 6, this calculated back-MMF current will vary over time because of actual variation of the capacitance 102 as the rotor 18 rotates to produce a back-MMF signal 115. Nevertheless, the amplitude 112 of the calculated back-MMF signal 115 will be proportional to the rotational speed of the rotor 18 and thus may be used to determine rotor speed. The variations over one cycle 114 of the MMF signal 115 provide an indication of position of the rotor 18, and the rotational distance of each cycle 114 will be equal to 360° of rotational travel divided by the number of poles (in this simplified case three) of the motor 12. It will be apparent that an angular positions of less than one cycle 114 may also be resolved according to the regular voltage variations during a cycle 114.

Generally, the position signals from each of the phases can be transformed into d and q components with the d component shown in solid line and the q component shown in dotted line in FIG. 6 and simply represented as the length of a corresponding quadrature phasor.

Figure 4:
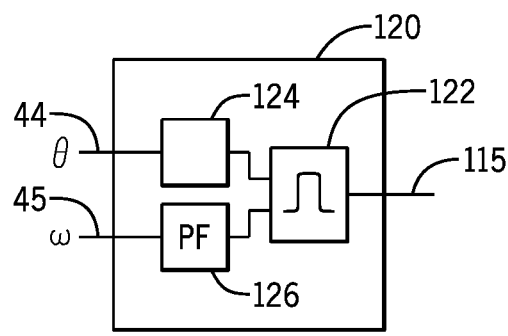
FIG. 4 is a more detailed block diagram of a back-current conditioning circuit being part of the back-current detection system for providing position and velocity information.

Referring now to FIG. 4, the back-MMF signal 115 may be generally processed by a conditioning circuit 120, for example, providing for bandpass filtration 122 to extract a reduced noise MMF signal 115 which may be provided to a mapper 124, for example, mapping the voltage values within one cycle 114 to particular angle values as position signals 44 and a peak follower 126 extracting the amplitude 112 for use as a velocity signal 45. Other well-known techniques of signal conditioning may be used including, for example, constructing an observer fitting this data to a model or the like.

Figure 5:
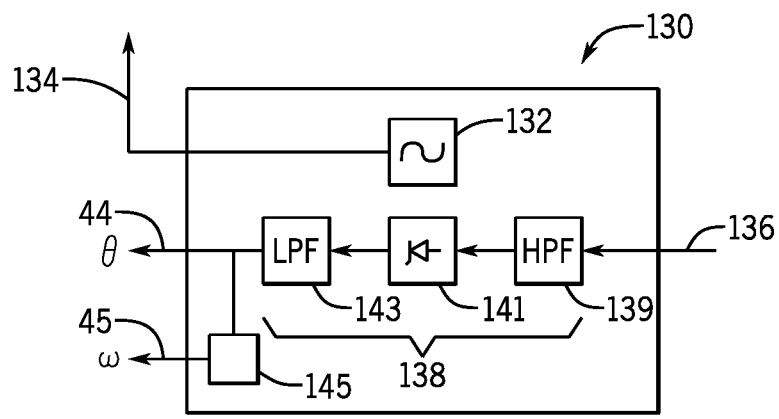
FIG. 5 is a block diagram of an injection signal conditioning circuit providing position information from which velocity information may be deduced.

Referring to FIGS. 2 and 5, an alternative source of position information may be obtained through a current injection provided by a current injection circuit 130. Generally, the current injection circuit 130 may create a high-frequency injection signal through injection signal generator 132, for example, having a frequency at least 10 times that of a cycle 114. The injection signal generator 132 may provide for injection output 134 which may be summed to the output of transformation circuit 56 to superimpose an additional current signal onto one electrode 16 of the stator 14 through the current-source drive 40.

This injection signal may be used in two ways. A first approach uses the injection signal to measure capacitive coupling between the stator 16 and the rotor 20 such as changes with rotation of the rotor 20. in this case, a voltage signal 136 may be received by the rotor 118 induced by the injection output 134 on the stator 14 but modified by changing mutual capacitance between the rotor 18 and stator 14 as the rotor 18 rotates. This signal 136 may be received by a high-pass filter 139 to reduce noise content and then demodulated, for example, using an extraction circuit such as a demodulator 138, depicted schematically as a rectifier 141 and low-pass filter 143, to extract the envelope of the signal 136 having a modulation frequency. The modulation frequency will have a period representing a frequency corresponding with a rotational speed of the rotor 20 and hence may be used to determine rotor speed 45, for example, using a frequency detector 145, for example, measuring this period and inverting the same. The phase of the envelope can be used to provide a position signal 44 measurement in a manner analogous to that described above with respect to FIG. 6. These output signals 44 and 45 may again be processed by a conditioning circuit 144, for example, providing for filtration or more sophisticated signal conditioning using observer technology or the like.

Figure 11:
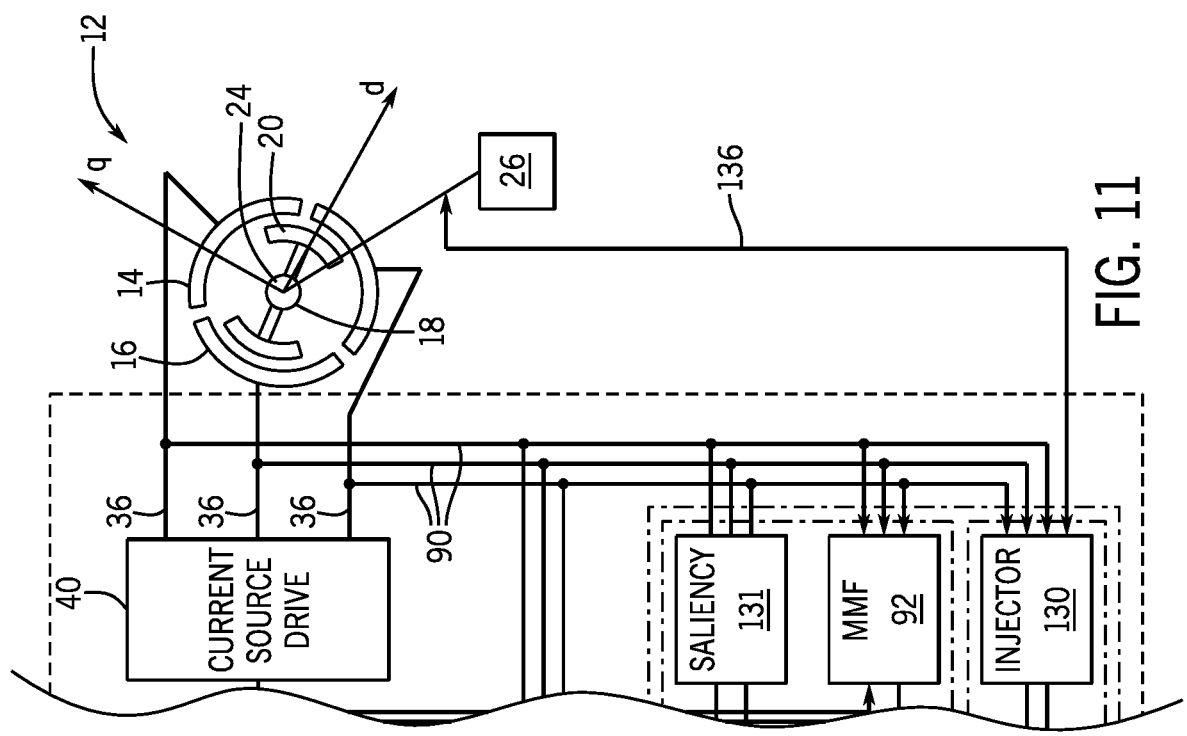
FIG. 11 is a fragmentary view of a block diagram of FIG. 2 showing an alternative approach of current injection into the rotor.

Referring momentarily to FIG. 11, it will be appreciated that the injection process may be reversed with the injection circuit 130 injecting directly into the rotor 20 and then monitoring the resultant changes in the signals 90. In this case signal 134 shown in FIG. 2 is not needed.

Figure 7:
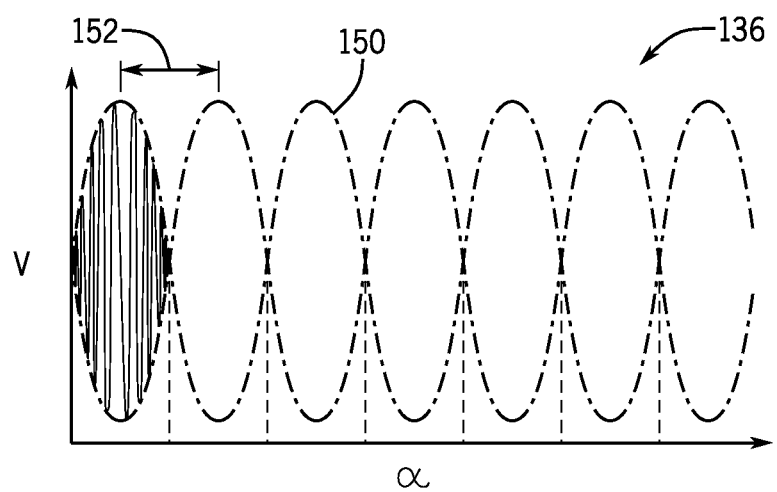
FIG. 7 is a plot of an injection signal prior to demodulation showing the position information in the injection signal envelope.

As an alternative to measuring changes in capacitive coupling described above, the injection signal may be used to detect changes in saliency of the electrostatic motor 12. Referring also to FIG. 7, in this case the voltage signals 90 may be monitored by a saliency detection circuit 131 to detect the changes in loading of the injection signal from the current source drive 40 caused by changes in saliency of the stator 16. Voltage signals 90 may be received by the saliency circuit 131 providing the same functional components as the current injection circuit 130 including a high-pass filter to reduce noise content and a demodulator and low-pass filter 143 to extract the envelope 150 of the signal 136 having a modulation frequency. The modulation frequency will have a period 152 representing a frequency generally twice as fast as cycle 114 and thus may be used to determine rotor speed 45, for example, using a frequency detector 145, for example, measuring period 152 and inverting the same. The phase of the envelope 150 can be used to provide a position signal 44 measurement in a manner analogous to that described above with respect to FIG. 6. Output signals from either the saliency circuit 131 or the current injection circuit 130 may be selected by switch 161 to be used as output signals 44 and 45.

Referring again to FIG. 2, each of the MMF detector 92 and the current injection circuit 130 or saliency circuit 131 can provide both position and rate signals; however, the MMF detector 92 has poor signal-to-noise ratio at low rotor speeds, and accordingly at low rotor speeds the current injection circuit 130 or the saliency detection circuit 131 may be used to provide position and velocity measurements. On the other hand, when the motor 12 is moving at high speed, the superior measurements provided by the MMF detector 92 may be used.

In this regard, a switching circuit 160 may automatically select between outputs from the conditioning circuit 120 and from the conditioner 140 according to a speed signal obtained from the comparison circuit 54. In this regard, comparison circuit 54 switches between these different detection systems' position detection systems according to the rate of speed of the rotor 18.

It will be appreciated that the present invention provides the ability to properly control a voltage vector applied to the electrostatic motor by a closed loop voltage regulation, thereby also providing the ability to control torque and in this way to provide torque control.

Certain terminology is used herein for purposes of reference only, and thus is not intended to be limiting. For example, terms such as "upper," "lower," "above," and "below," refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context. Although the stator and rotors are shown as disks in the disclosed embodiments, there is no requirement that the stator or rotor be in a disk form.

When introducing elements or features of the present disclosure and the exemplary embodiments, the articles "a," "an," "the," and "said," are intended to mean that there are one or more of such elements or features. The terms "comprising", "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An electrostatic motor drive for an electrostatic motor of a type having a stator with multiple stator electrodes adapted to generate a rotating stator electric field vector about an axis and a rotor having multiple rotor electrodes providing a rotor electric field interacting with the rotating electric field primarily by electrostatic forces rather than magnetic forces to rotate about the axis, the electrostatic motor drive comprising:
   a set of current-stiff drives adapted to connect to the multiple stator electrodes;
   a back-current monitor circuit detecting a back-current value from the electrostatic motor proportional to rotor speed;
   a back-current conditioning circuit receiving the detected back-current value to provide an estimate of at least one of rotor position and rotor speed; and
   a comparison circuit receiving the estimated one of rotor position and rotor speed and a motor control value and comparing the two to produce an error output to the set of current-source drives; wherein
   the back-current monitoring circuit takes voltage measurements at connections between the current-source drives and corresponding stator electrodes.

2. The electrostatic motor drive of claim 1 wherein the speed drive of claim 1 and the current-source drives provide a set of electrical switches in series with a current-source implemented by an inductance serving to provide current stiffness and regulate the stator electrode voltage.

3. The electrostatic motor drive of claim 2 wherein the back-current monitoring circuit extracts stator voltages from measured signals and eliminates common mode voltages.

4. The electrostatic motor drive of claim 2 wherein the back-current monitoring circuit models an impedance of the stator circuit to deduce current through each stator electrode and compares that deduced current to a drive current from the current-source drive associated with the stator electrode to deduce back-current.

5. The electrostatic motor drive of claim 1 wherein the back-current conditioning circuit further measures a phase and magnitude of the back-current to A provide the rotor position and rotor speed signals.

6. The electrostatic motor drive of claim 1 further including:
 a signal generator providing an injection signal to one of the rotor and stator;
 an extraction circuit monitoring at least one of the rotor and stator to extract a resulting signal indicating at least one of capacitive coupling between the rotor and stator and changing effective capacitance of at least one of the rotor and stator; and
 an injection processing circuit receiving the resulting signal to provide an estimated rotor position;
 wherein the comparison circuit also receives the estimated rotor position signal from the injection processing circuit to develop the error output.

7. The electrostatic motor drive of claim 6 wherein the injection processing circuit further provides an estimated rotor speed.

8. The electrostatic motor drive of claim 7 further including a switch for selectively communicating one of the estimated rotor position signals from the injection processing circuit and the estimated rotor positioning signal from the back-current conditioning circuit for use by the comparison circuit.

9. The electrostatic motor drive of claim 8 wherein the switch is controlled by an estimated rotor speed derived from at least one of the back-current conditioning circuit and the injection processing circuit.

10. The electrostatic motor drive of claim 7 wherein the extraction circuit provides demodulation of the injection signal after modification by the electrostatic motor.

11. The electrostatic motor drive of claim 7 wherein the injection processing circuit further receives the detected injection signal after modification by the electrostatic motor to provide at an estimated rotor velocity signal; and wherein the comparison circuit further uses the velocity signal to provide the error output.

12. The variable speed drive of claim 1 further including an input circuit receiving a motor control value selected from the group of commands of torque and speed to control current applied to the stator electrodes.

13. The variable speed drive of claim 1 wherein the stator includes three electrically independent sets of electrodes in equal angles about the axis, the electrodes of each set joined electrically to a common terminal.

14. The variable speed drive of claim 1 further including an electrostatic motor of a type having a stator with multiple stator electrodes receiving output from the current-source drives and adapted to generate a rotating stator electric field vector about the axis and a rotor having multiple rotor electrodes providing a rotor electric field interacting with the rotating electric field primarily by electrostatic forces rather than magnetic forces.

15. The variable speed drive of claim 14 further wherein the electrostatic motor provides at least 60 poles.

16. An electrostatic motor drive for an electrostatic motor of a type having a stator with multiple stator electrodes adapted to generate a rotating stator electric field vector about an axis and a rotor having multiple rotor electrodes providing a rotor electric field interacting with the rotating electric field primarily by electrostatic forces rather than magnetic forces to rotate about the axis, the electrostatic motor drive comprising:
 a set of current-stiff drives adapted to connect to the multiple stator electrodes;
 a signal generator providing an injection signal to one of the rotor and stator;
 an extraction circuit monitoring an other of the rotor and stator to extract a resulting signal indicating at least one of capacitive coupling between the rotor and stator and changing effective capacitance of at least one of the rotor and stator; and
 a conditioning circuit receiving the resulting signal generator to provide an estimated rotor position;
 a comparison circuit receiving the estimated rotor position and a motor control value and comparing the two to produce an error output to the set of current-source drives to control the electrostatic motor.

17. A method of providing variable speed control of an electrostatic motor of a type having a stator with multiple stator electrodes adapted to generate a rotating stator electric field vector about an axis and a rotor having multiple rotor electrodes providing a rotor electric field interacting with the rotating electric field primarily by electrostatic forces rather than magnetic forces to rotate about the axis, comprising the steps of:
 providing a set of current-source drives for providing current to the stator electrodes;
 detecting a back-current value from sensed voltages driving the electrostatic motor, the back current proportional to rotor speed;
 processing the detected back-current value to provide an estimated rotor position;
 receiving the estimated rotor position and measures of outputs of the current-source drives to develop a measured d-q vector;
 receiving a desired d-q vector and comparing it to the measured d-q vector to produce an error output; and
 transforming the error output to produce a set of outputs provided to the current-source drives for driving the stator electrodes.

* * * * *